US012337328B2

(12) United States Patent
Burhorst

(10) Patent No.: US 12,337,328 B2
(45) Date of Patent: Jun. 24, 2025

(54) COMMINUTING DEVICE

(71) Applicant: VOGELSANG GMBH & CO. KG, Essen (DE)

(72) Inventor: Torsten Burhorst, Garrel (DE)

(73) Assignee: VOGELSANG GMBH & CO KG, Essen (DE)

( * ) Notice: Subject to any disclaimer, the term of this patent is extended or adjusted under 35 U.S.C. 154(b) by 345 days.

(21) Appl. No.: 17/924,409

(22) PCT Filed: May 10, 2021

(86) PCT No.: PCT/EP2021/062369
§ 371 (c)(1),
(2) Date: Nov. 10, 2022

(87) PCT Pub. No.: WO2021/228786
PCT Pub. Date: Nov. 18, 2021

(65) Prior Publication Data
US 2023/0271191 A1 Aug. 31, 2023

(30) Foreign Application Priority Data
May 11, 2020 (DE) ..................... 20 2020 102 630.5

(51) Int. Cl.
*B02C 18/00* (2006.01)
*B02C 18/10* (2006.01)
(Continued)

(52) U.S. Cl.
CPC .......... *B02C 18/0092* (2013.01); *B02C 18/10* (2013.01); *B02C 18/142* (2013.01); (Continued)

(58) Field of Classification Search
CPC ... B02C 23/08; B02C 18/142; B02C 18/0084; B02C 18/0092
See application file for complete search history.

(56) References Cited

U.S. PATENT DOCUMENTS 3,396,914 A 8/1968 Liebman
3,940,115 A 2/1976 Zipperer
(Continued)

FOREIGN PATENT DOCUMENTS

CN 103476503 12/2013
CN 104324787 2/2015
(Continued)

OTHER PUBLICATIONS

Translation of CN-110520218.*
Translation of KR-100791613.*
Translation of KR-100506028.*

*Primary Examiner* — Bobby Yeonjin Kim
(74) *Attorney, Agent, or Firm* — PRICE HENEVELD LLP

(57) ABSTRACT

A comminuting device for solids-conducting liquids includes a housing with an inlet opening, an outlet opening and a housing interior space which extends from the inlet opening to the outlet opening. A first comminuting shaft arranged for rotation about a first comminuting shaft axis, and a second comminuting shaft arranged for rotation about a second comminuting shaft axis each extend through the housing interior space. A first screen device is arranged in the housing interior space adjacently with respect to the first comminuting shaft with a first screen wall having a multiplicity of slots. A first evacuating device with a plurality of evacuating elements which can be moved along a movement path relative to the screen wall extends through the plurality of slots on at least one portion of the movement path.

17 Claims, 4 Drawing Sheets

(51) Int. Cl.
*B02C 18/14* (2006.01)
*B02C 23/16* (2006.01)
*B02C 18/16* (2006.01)

(52) U.S. Cl.
CPC ........ *B02C 23/16* (2013.01); *B02C 2018/164* (2013.01); *B02C 2023/165* (2013.01); *B02C 2201/063* (2013.01)

(56) References Cited

U.S. PATENT DOCUMENTS

| | | | | |
|---|---|---|---|---|
| 5,505,388 | A * | 4/1996 | Chambers ............... B02C 23/08 241/46.06 | |
| 5,562,257 | A | 10/1996 | Graveman et al. | |
| 5,609,307 | A | 3/1997 | Rota | |
| 5,833,152 | A | 11/1998 | Galanty | |
| 6,012,662 | A | 1/2000 | Sullivan | |
| 6,109,551 | A | 8/2000 | Sullivan | |
| 6,176,443 | B1 | 1/2001 | Boyd et al. | |
| 6,241,170 | B1 | 6/2001 | St. Clair | |
| RE37,349 | E | 9/2001 | Chambers, Sr. et al. | |
| 6,332,984 | B1 | 12/2001 | Boyd et al. | |
| 6,938,845 | B2 | 9/2005 | Galanty | |
| 7,198,212 | B2 | 4/2007 | Kato et al. | |
| 7,380,736 | B2 | 6/2008 | Nemedi | |
| 9,573,137 | B2 | 2/2017 | Van der Gallen | |
| 10,130,952 | B2 | 11/2018 | Sabol et al. | |
| 10,737,274 | B2 | 8/2020 | Schneider | |
| 11,084,042 | B2 | 8/2021 | Burhorst et al. | |
| 11,203,020 | B2 | 12/2021 | Burhorst et al. | |
| 2008/0302890 | A1 | 12/2008 | Misawa et al. | |
| 2012/0037740 | A1 | 2/2012 | Galanty | |
| 2014/0332613 | A1 | 11/2014 | Zhou et al. | |

FOREIGN PATENT DOCUMENTS

| | | | | |
|---|---|---|---|---|
| CN | 204816753 | | 12/2015 | |
| CN | 110177624 | | 8/2019 | |
| CN | 110369264 | | 10/2019 | |
| CN | 110520218 | | 11/2019 | |
| CN | 110520218 | A * | 11/2019 | ......... B02C 18/0092 |
| DE | 1819645 | | 10/1960 | |
| DE | 1284267 | | 11/1968 | |
| DE | 2139497 | | 2/1973 | |
| DE | 7234578 | | 2/1973 | |
| EP | 2613884 | B1 | 9/2011 | |
| EP | 2586531 | | 5/2013 | |
| EP | 2613884 | | 7/2013 | |
| JP | 1988077555 | | 4/1988 | |
| JP | 2002263516 | | 9/2002 | |
| JP | 2007090166 | | 4/2007 | |
| JP | 2017023937 | | 2/2017 | |
| KR | 100506028 | B1 * | 8/2005 | ............. B02C 23/08 |
| KR | 100791613 | B1 * | 1/2008 | ............. B02C 23/08 |
| KR | 101636540 | | 7/2016 | |
| WO | 2010108932 | | 9/2010 | |
| WO | 2018146247 | | 8/2018 | |
| WO | 2019126456 | | 6/2019 | |
| WO | WO-2019126456 | A1 * | 6/2019 | ......... B02C 18/0092 |
| WO | WO-2019126603 | A1 * | 6/2019 | ......... B02C 18/0084 |

* cited by examiner

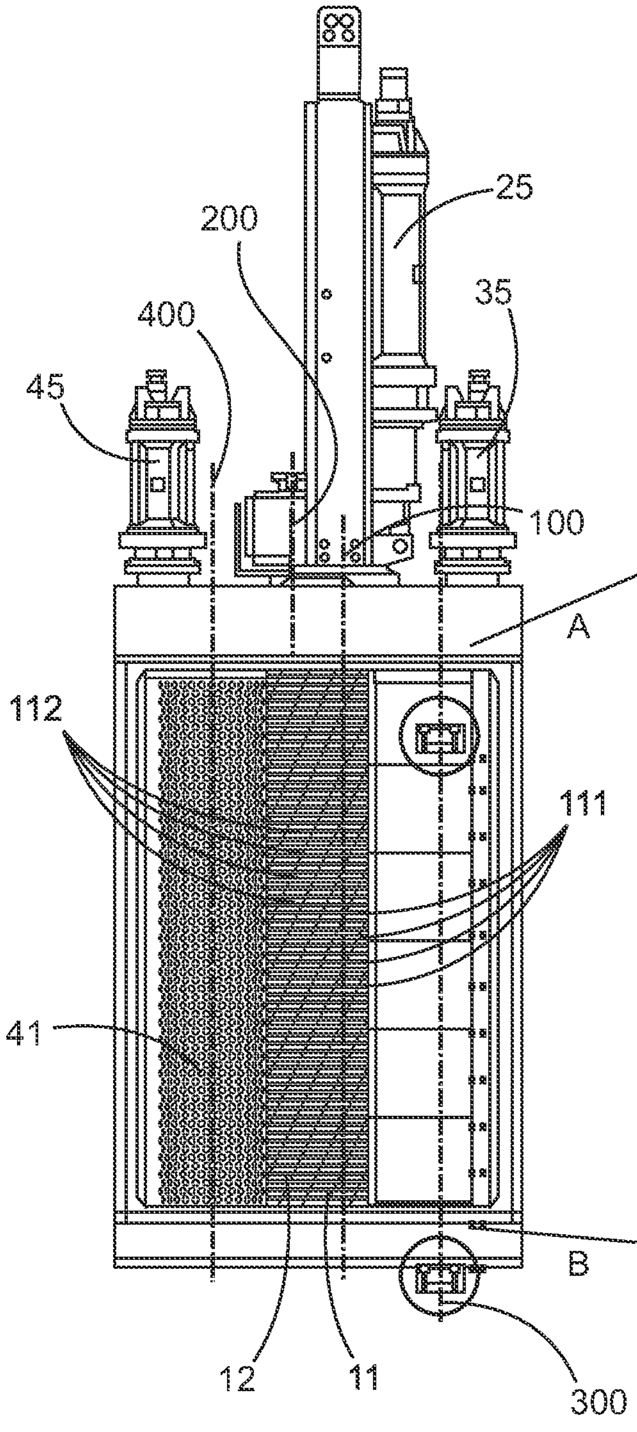
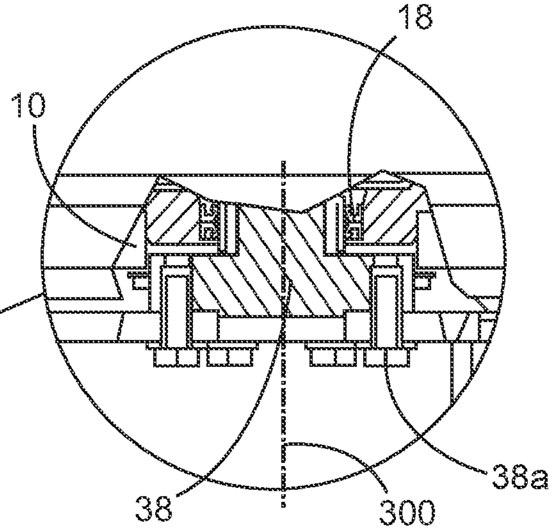
Fig. 3a
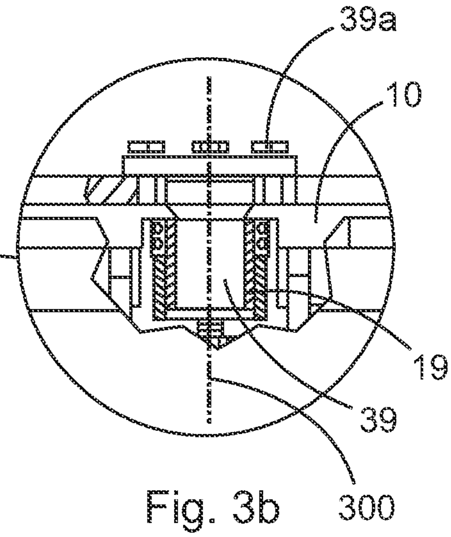
Fig. 3b
Fig. 3

COMMINUTING DEVICE

CROSS-REFERENCE TO FOREIGN PRIORITY APPLICATION

The present application claims the benefit under 35 U.S.C. §§ 119(b), 119(e), 120, and/or 365(c) of PCT/EP2021/062369 filed May 10, 2021, which claims priority to German Application No. 20 2020 102 630.5 filed May 11, 2020.

FIELD OF THE INVENTION

The invention relates to a comminuting device for solids-conducting liquids, comprising: a housing with an inlet opening, an outlet opening and a housing interior space which extends from the inlet opening to the outlet opening, a first comminuting shaft which extends through the housing interior space, is arranged for rotation about a first comminuting shaft axis, and to which a multiplicity of first comminuting cutting elements which are spaced apart axially along the first comminuting shaft axis are fastened, a drive device for driving the first comminuting shaft in a rotational movement, a comminuting flow path which extends through the interior space from the inlet opening around the comminuting shaft to the outlet opening, a first screen device which is arranged in the housing interior space adjacently with respect to the first comminuting shaft with a first screen wall with a multiplicity of screen wall openings and a first evacuating device for removing blockages from the screen wall openings, the screen device and the evacuating device being movable relative to one another.

BACKGROUND OF THE INVENTION

Comminuting devices of the abovementioned design are used to treat solids-loaded liquids in such a way that the solids are comminuted and, after exit from the outlet opening of the comminuting device, the solids which are contained in the liquid no longer exceed a maximum size. Here, the comminution of the solids typically takes place by way of shearing and tearing forces which act on the solids when they pass between the comminuting cutting elements.

The comminuting efficiency of comminuting devices of this type is decisively dependent on the fact that gaps and clearances which arise for the passage of the liquid are minimized in such a way that solids above a certain size cannot pass from the inlet opening to the outlet opening, without a comminuting action being performed on said solids. This stipulation has the consequence that the cross section which remains for the liquid flow through the comminuting device is small precisely when a high degree of fineness and a small size of the solids which exit from the outlet opening are aimed for, and therefore the comminuting device represents a high flow resistance. Comminuting devices are used in many applications, however, precisely so as to be installed in the flow feed to a pump, in order to reliably prevent, as a result, damage of the pump by way of solids above a certain size. Both in the case of self-priming pumps and also in the case of non-self-priming pumps, an increased flow resistance in the feed is disadvantageous for the pumping action, and the aim is therefore to configure the flow in the feed to the pump to be as free from resistance as possible.

It is fundamentally known to solve the problem of the flow resistance of comminuting devices of this type by the spacing between the two comminuting shafts being increased, the length of the comminuting shafts being increased, and the size of the comminuting cutting elements or the diameter of comminuting cutting elements which are configured as a disk with circumferentially arranged cutting teeth to be increased. Although these measures can solve the problem of an increased flow resistance, they lead to comminuting devices which take up a large amount of installation space, are heavy and cause additional manufacturing costs.

WO 2018/146247 A1 has previously disclosed a comminuting device, in the case of which in each case one curved wall which is provided with slots is provided on both sides next to two comminuting shafts which mesh with one another. In the case of this device, the liquid which flows through the comminuting device is provided with an additional passage cross section next to the comminuting shafts, it being possible for solids to pass said additional passage cross section only when they have a size which is smaller than the slot size. In order to avoid blockages of the slots, it is provided in the case of this device for the slots to be evacuated by means of evacuating fingers which move in a meshing manner through the slots. Although it has been shown that this type of comminuting device provides an increased liquid throughput and maintains it even in the case of many types of solids over a long operating time period without the occurrence of blockages, an accumulation occurs in the slots in certain circumstances, in particular when solids with a high proportion of strong fibers are contained in the fluid, which accumulation can no longer be removed even by way of the evacuating fingers, and blockages which impede the throughflow and the evacuating finger movement are built up as a result.

WO 2019/126456 A1 has previously disclosed a comminuting device which, in a symmetrical construction, likewise has a bypass liquid conducting means by way of two drums. Here, the drums are sealed with respect to the housing by means of a side rail which is equipped with a seal element. Said seal element can be configured as a plastic strip or brush. This previously known embodiment therefore comprises the function that the liquid can pass exclusively through the two drums and through the clearances between the comminuting elements as a result of exact sealing by means of plastic strips or a sealing brush, and therefore follows the approach of achieving a cleaning function of the openings of the screen drum by way of a correspondingly generated high pressure gradient or the avoidance of a pressure drop by way of a gap intermediate space between the drum and the housing inner wall. It has been shown in practice, however, that sufficient clearing of the openings of the screen drum cannot be achieved as a result and, depending on the nature of the solids in the solids-containing liquid which is fed in, the openings in the screen drum can block relatively rapidly and are not flushed automatically, although a corresponding sealing action and corresponding pressure differences are built up.

The invention is based on the object of providing a comminuting device while avoiding disadvantages of this type, which comminuting device achieves a reliable comminution with a reduced flow resistance in the case of liquid flows with a low solid proportion and a high volume throughput and also in the case of liquid flows with a high solid proportion.

SUMMARY OF THE INVENTION

According to the invention, this object is achieved by way of a comminuting device of the type described at the outset, in the case of which a bypass flow path which runs in parallel to the comminuting flow path extends through the plurality of screen wall openings from the inlet opening to the outlet opening, and the evacuating device is formed by way of at least one brush element with a multiplicity of brush hairs, the first screen wall and the brush element being movable relative to one another, and the brush hairs engaging at least partially into the screen wall openings in the case of relative movement of the brush element with respect to the screen wall.

According to the invention, a brush element is provided to clear or keep clear the screen wall openings in the screen walls of solids. To this end, a relative movement is provided between the brush element and the screen wall, by way of which relative movement the evacuating action is achieved. This relative movement can preferably be configured in such a way that the brush element is fixed in a stationary manner to the housing and the screen wall moves relative to the housing. A movement of the brush element in the case of a screen wall which is stationary with respect to the housing can also conversely be provided, however, or both the screen wall and the brush element can move relative to the housing. The invention is based on the finding that the use of a brush element, instead of evacuating fingers which mesh through slots in the screen wall, brings about clearing of the openings in the screen wall which is more reliable with respect to fibers. To this extent, freeing of the openings from fibers of this type can surprisingly already be achieved at an early stage before said fibers have settled at the edges of the openings, and, although a brush element is to be considered, in comparison with an evacuating finger, to be an evacuating device which is less stable and, as a consequence, operates with lower evacuating forces, more effective clearance of the openings of the screen wall can nevertheless be achieved with respect to fibers of this type.

Here, the brush element can be configured from a brush strip which extends along the screen drum outer wall. Here, for example, the brush element can run parallel to the screen drum axis or can extend obliquely, for example helically, around the screen drum axis. The brush element is preferably arranged along its entire course in a single radius around the screen drum axis, with the result that each portion of the brush element is at an identical spacing from the screen drum axis. The brush element has a multiplicity of brush hairs. Said brush hairs are firstly arranged next to one another in a longitudinal extent of the brush element, but can also be arranged in a plurality of rows with respect to one another, with the result that a plurality of brush hairs are also arranged next to one another transversely with respect to the direction of extent of the brush element. The brush hairs are preferably configured from a plastic; for example, the brush hairs can be configured from polyethylene, polyamide, or polypropylene. It is preferred, in particular, if the brush hairs are of stiffer configuration than, for example, brushes made from natural hair. Suitable for the use according to the invention are, in particular, brush elements, the brush hairs of which have an elastic restoring capacity after the deformation which, in the case of a deformation by up to 5%, preferably up to 10% and in particular up to 20%, achieve a virtually complete or full elastic springback into the starting geometry without plastic deformation components.

The brush hairs of the brush element preferably engage at least partially into the screen wall openings. This means that the screen wall and the brush element are arranged with respect to one another in such a way that the ends of the brush hairs protrude at least slightly into the screen wall openings when the screen wall and the brush element do not move relative to one another. As a consequence, the brush hairs are not arranged at a spacing from the screen wall, but rather lie on the screen wall. As a result, an effective removal of solids which are caught in the screen wall openings is achieved. In certain applications, the brush hairs can also be arranged at a small spacing from the outer screen wall surface, with the result that, only when a solid is deposited in the opening and, as a result, protrudes beyond the outer screen wall surface, it is gripped and removed by the brush hair. This brings about a gentle configuration of the contact between the brush element and the screen wall, and low wear of the brush hairs.

As a consequence, direct mechanical cleaning and clearing of blockages of the openings in the screen drum is achieved by way of the provision according to the invention of the brush hairs. To this end, in particular, the brush element can be configured in such a way that mechanically robust brush hairs are configured thereon. The brush element can be configured in such a way that the brush hairs are arranged therein spaced apart in the axial direction of the rotational axis of the screen drum, in particular in such a way that there are spacings between the brush hairs of the brush elements, through which spacings the liquid can flow. The brush element can have, in particular, a multiplicity of brush hair tufts which are arranged spaced apart axially from one another in the direction of the rotational axis of the screen drum, in each case one clearance being arranged between adjacent brush hair tufts, through which clearance the liquid can flow. As a result, a satisfactory cleaning function of the brush element is achieved on account of the flow around the brush hair tufts. Here, the brush element dispenses with a sealing function. It can be provided, in particular, that the brush element does not act as a seal element, that is to say, in particular, does not seal the intermediate space between the screen drum and the housing.

A first preferred embodiment of the comminuting device according to the invention is distinguished by a second comminuting shaft which extends through the housing interior space, is arranged for rotation about a second comminuting shaft axis, and to which a multiplicity of second comminuting cutting elements which are spaced apart axially along the second comminuting shaft axis are fastened, the drive device being configured to drive the second comminuting shaft in a rotational movement. By way of a second comminuting shaft of this type, solids can be comminuted effectively in the region between the two comminuting shafts and in the respective region which lies on the outside of the meshing region of the two comminuting shafts, said comminuting action being achieved by way of a combined shearing and tearing action and, as a result, a high throughput of solids and liquid already being achieved in the region of the two comminuting shafts. In addition, a favorable flow of the fluid in the inlet-side region upstream of the comminuting shafts and the screen walls can be achieved by way of the flow effect which the two comminuting shafts generate, which promotes the transport of large solids away out of the region of the screen walls into the region of the comminuting shafts. To this end, it is preferred, in particular, if the two comminuting shafts move in an opposed direction with respect to one another and in the process carry out a rotational movement in their region, in which they mesh with one another, which rotational movement generates a conveying action from the inlet opening to the outlet opening.

It is preferred even further if the screen device is configured as a screen drum about a screen drum axis, on the circumference of which the screen wall is arranged. As a result of the configuration of the screen device as a screen drum, firstly favorable flow conducting is made possible both on the inlet side and on the outlet side. Furthermore, as a result of this configuration, the relative movement between the brush element and the screen wall can favorably be carried out by way of a rotational movement or pivoting movement about the screen drum axis. Here, the screen drum can preferably rotate or pivot about the screen drum axis.

Furthermore, the comminuting device can be developed by an evacuating drive device which is coupled to the first screen device or the first evacuating device for the generation of a relative movement between the first screen device and the first evacuating device. An evacuating drive device of this type which can be configured, for example, as an electric motor or hydraulic motor generates a preferably constant or periodically acting relative movement between the screen wall and the brush element and, as a result, clears the openings of solids. The evacuating drive device can also be formed, in particular, by way of a drive device of the comminuting shafts, for example by the comminuting shafts and the screen drum and/or the brush element being coupled to one another and being driven synchronously by way of a drive device. A coupling of this type can be configured, for example, by way of a gearwheel mechanism, a belt drive, a mechanical lever construction or the like.

It is further preferred here, in particular, if the screen drum is mounted rotatably about the screen drum axis, and the evacuating drive device is coupled to the screen drum in order to drive the screen drum in a rotational movement about the screen drum axis. In the case of this embodiment, the screen drum rotates about the screen drum axis in a constant or pivoting (reciprocal) movement, and the brush element can be arranged, in particular, in a stationary manner on the housing and can exert the evacuating effect by way of this rotational movement of the screen drum.

It is provided in accordance with a further preferred embodiment that

- the screen drum is arranged adjacently with respect to the first comminuting shaft, and the screen wall extends, starting from the region which adjoins the comminuting shaft, over an inlet circumferential angle which defines the circumferential portion of the screen drum, via which fluid which flows in through the inlet opening can flow through the screen wall into the screen drum, and the screen wall is divided into a plurality of screen wall segments, of which at least one screen wall segment extends over a segment circumferential angle about the screen drum axis which is smaller than or equal to the inlet circumferential angle, or
- the screen drum is arranged adjacently with respect to the first comminuting shaft, and the screen wall extends, starting from the region which adjoins the comminuting shaft, over an outlet circumferential angle which defines the circumferential portion of the screen drum, via which fluid which flows to the outlet opening can flow out of the screen drum through the screen wall, and the screen wall is divided into a plurality of screen wall segments, of which at least one screen wall segment extends over a segment circumferential angle about the screen drum axis which is less than or equal to the outlet circumferential angle.

In accordance with this embodiment, the screen wall is divided into a plurality of screen wall segments which are arranged next to one another about the screen drum axis in the circumferential direction of the screen drum. One screen wall segment therefore extends around the screen drum axis only by a limited angular region which is smaller than the overall circumferential angle of the screen wall; for example, the screen wall can be divided into two screen wall segments which extend in each case over 180°, or into three screen wall segments which extend in each case over 120° circumferential angle. At least one of the screen wall segments of a screen drum extends here over a circumferential angle which is so small that said screen wall segment, starting from mounting through the inlet opening, can be dismantled and can be removed in the direction of the inlet opening or, starting from mounting through the outlet opening, can be dismantled and can be removed through the outlet opening. In this way, without the dismantling of a comminuting shaft of the screen drum itself being necessary, removal can be carried out. As a result of this removal of a screen wall segment, firstly the interior space of the screen drum becomes accessible and can therefore be freed with low maintenance complexity from solids accumulating therein.

As a result, it is made possible, in particular, for relatively small solids which pass through the openings but accumulate in the interior space of the screen drum to be removed again without great maintenance complexity and, as a result, to re-establish the throughput through the comminuting device in the original magnitude. Secondly, as a result, the access into the interior space of the screen drum is also made possible in an easy way, which is helpful, for example, for maintenance work on the bearings of the screen drum. Finally, this configuration can also achieve a replacement of damaged screen wall segments in a simple way and without dismantling of the screen drum, which is in turn an advantageous maintenance option. For this purpose, it is preferred, in particular, if all screen wall segments extend over a circumferential angle which makes dismantling of this type through the inlet opening or through the outlet opening possible, without the dismantling of the screen drum or one or both comminuting shafts being necessary to this end.

It is provided in accordance with a further preferred embodiment that the screen drum has a screen drum frame, to which the screen wall segments are fastened, and that the at least one screen wall segment is fastened releasably to the screen drum frame and can be folded open or dismantled radially to the outside in relation to the screen drum axis. The configuration of the screen drum with a screen drum frame firstly makes an inherently rigid and stable frame construction of the screen drum possible with a satisfactory support of the screen wall segments even with respect to relatively high pressure gradients which can occur from the inlet opening to the outlet opening and act on the screen wall segments. Here, the screen drum frame can be formed by a respective end-side end plate, for example a round end plate, and struts in the region of the outer circumference which extend axially between said end-side end plates. The struts can be arranged at an angular spacing from one another which corresponds to the angle of extent of a screen wall segment. It is preferred, for example, if the screen wall segments are fastened by way of a connection by means of a plurality of screws to said struts, with the result that stable fastening and at the same time simple releasability of the screen wall segments are realized. Here, a screen wall segment can be fastened overall releasably to the screen drum frame or else can be folded open, by being fastened to the screen drum frame by way of a hinge, joint or the like. The releasability or fold-open capability is preferably designed here in such a way that the screen wall segment can be removed or folded radially to the outside. As a result of this configuration, the dismantling or the folding open of the screen wall segment is not blocked by material which is situated in the interior space of the screen drum, with the result that the purpose of cleaning can be carried out even in the case of rough interior space contamination. It is also preferred, furthermore, if the screen wall segments are fastened in an outer circumferentially flush manner to the screen drum frame, in such a way that the outer surface of the screen wall segments is arranged about the screen drum axis at a radius which is greater than or equal to the radius of a proportion of the screen drum frame which projects to the outside, or the screen wall segments are fastened in an outer circumferentially flush manner with respect to one another to the screen drum frame, in such a way that the outer surface of the screen wall segments covers the screen drum frame completely.

In accordance with this embodiment, the screen wall segments are arranged over the outer circumference either in such a way that the entire outer circumference of the screen drum axis is formed by the screen wall segments, or the outwardly projecting proportions of the screen drum frame are arranged in such a way that they are arranged in a flush manner with respect to the outer surface of the screen wall segments or so as to be set back radially inward with respect to the latter. As a result of this configuration, cleaning of the openings in the screen wall segments is possible in a simple way by rotation of the screen drum, for example, by stationery brush elements being arranged at a spacing from the outer surface of the screen wall segments, which spacing is such that the brush elements sweep over the screen wall segments, are at a small spacing from the screen wall segments, or lie on the outer surfaces of the screen wall segments in such a way that the brush hairs penetrate slightly into the openings.

Furthermore, it is preferred if the screen drum is mounted in the housing by means of two axle stubs such that it can be rotated about the screen drum axis, and that the axle stubs can be dismantled from the interior space of the screen drum or from outside the housing. Furthermore, it is preferred if, after dismantling of this type of the axle stubs or general dismantling of the drum axis mount, the screen drum can be removed from the housing through the inlet or outlet opening in a radial direction in relation to the rotary drum axis. The configuration of the mounting of the screen drum by means of two axle stubs of this type advantageously makes it possible that the screen drum can be dismantled without installation space which is relevant for this purpose being required above or below the housing in the axial direction of the screen drum axis. Here, one axle stub is a short axle which does not extend over the entire length of the screen drum, but rather is arranged only at its respective end-side ends and serves for mounting of the screen drum. Here, the axle stub or the rotary mount can preferably be dismantled toward the inside into the interior space of the screen drum and by way of mounting steps which are brought about from the interior space. As a result, access to the housing from outside is not necessary for this dismantling, with the result that the mount of the screen drum can be dismantled comfortably after removal of a screen wall segment. As an alternative, in the case of certain arrangements, dismantling of the mount of the screen drum from the outside can also be preferred; here too, as a result of the use of axle stubs, it is not necessary to provide a large mounting space, for example dimensioned in accordance with the screen drum length, in order for it to be possible for an axle which extends completely through the screen drum to be pulled. After dismantling of the mounts has taken place, the screen drum can be removed radially. This allows the screen drum to be removed from the housing through the inlet opening or outlet opening, and facilitates maintenance work on the screen drum or its mounts considerably. Contrary to customary constructions, in the case of which the housing has to make a removal of a cover possible in order to remove the screen drum in the axial direction, firstly a considerable amount of installation space which would be necessary for dismantling of this type can be saved as a result, and secondly simple mounting and maintenance of the screen drum can be achieved, by the access which is frequently easy in any case through the inlet opening or the outlet opening being utilized to dismantle the screen drum and to remove it from the housing.

It is also preferred, furthermore, if the screen drum is mounted in the housing rotatably about the screen drum axis at a first end by way of a first rotary bearing and at a second end by way of a second rotary bearing, and the first and/or the second rotary bearing, preferably the rotary bearing which is arranged at the bottom in the installed position of the comminuting device, are/is a plain bearing. As a result of the use of a plain bearing on one side or both sides of the screen drum for rotary mounting thereof, a mount is achieved which is firstly robust and secondly corrosion-insensitive, which mount can continue to fulfill its mounting task even in the case of entry of media. When, in particular, the interior space of the housing is under high pressure and flow passes through it, it is advantageous if a plain bearing is used, in order to maintain a reliable rotary mount even when a bearing seal fails. A plain bearing has the further advantage that simple dismantling of the mounted axle is possible, by it being pulled axially out of the bearing. This is advantageous, in particular, in the case of the use of axle stubs, in order to bring about rapid and structurally uncomplicated dismantling of the screen drum as a result.

According to the invention, a screen device is provided which has a screen wall. The solids-conducting liquid can flow through the screen wall from the inlet opening to the outlet opening, it being prevented on account of the screen effect that solids above a defined size, namely above the screen mesh width or opening size, can pass the screen wall. As a result of the screen wall, therefore, a reduction in the flow resistance by the comminuting device is achieved, by additional flow paths being provided for the liquid. It is avoided here that solids above a defined size can flow through the comminuting device on said flow paths.

In order to keep the screen wall with the openings contained therein permeable, an evacuating device is provided according to the invention, furthermore. The evacuating device comprises a plurality of brush hairs, a relative movement taking place between the brush hairs and the screen wall. As a result of this relative movement, the brush hairs grip solids which partially or completely block the openings, evacuate them, and keep the openings free as a result.

The relative movement can fundamentally be driven actively or passively; for example, the relative movement can be brought about by way of the flow effect of the liquid through the comminuting device, this possibly being achieved by way of corresponding flow guiding elements which are coupled to the brush elements or the screen device. Furthermore, the evacuating device or the screen device can be coupled to the first and/or the second comminuting shaft and can be driven by way of the coupling, which brings about a synchronization of the relative movement with the movement of the comminuting cutting elements.

In accordance with a first preferred embodiment, the comminuting device can be developed by an evacuating drive device which is coupled to the first evacuating shaft and sets the first evacuating shaft in rotation. In accordance with this development, an evacuating drive device is provided such as, for example, an electric motor, a hydraulic motor or the like, by way of which the evacuating shaft, to which the evacuating elements are fastened, is set in rotation, with the result that the evacuating elements describe a circular path as movement path, and this circular path extends at least in sections through the slots. It is to be understood that each evacuating element fundamentally follows a dedicated movement path; for example, each evacuating element is assigned to a slot in the screen wall and evacuates the latter, or else that a plurality of evacuating elements of this type are provided for evacuating of a slot, and brush through the latter in a manner which follows one another on a coinciding or differing movement path.

In accordance with a further preferred embodiment, it is provided that the evacuating drive device comprises hydrodynamically acting fluid guiding elements which are arranged in the interior space and are flowed onto by the liquid flow flowing through the interior space, or an electrically, pneumatically, or hydraulically driven motor. In accordance with this embodiment, the evacuating drive device is configured by way of fluid guiding elements such as guide blades which are flowed onto and set in motion by the liquid flow through the interior space, as a result of which the rotation of the first evacuating shaft is brought about. As an alternative, a motor can be provided which generates a movement of the evacuating elements which is brought about independently of the throughflow of the interior space. This motor can be arranged, in particular, outside the interior space, in order to avoid loading of the motor with liquid as a result.

It is provided in accordance with a further preferred embodiment that the first and second comminuting shaft between the first screen device and a second screen device with a second screen wall which has a plurality of openings, and a second evacuating device with at least one second brush element with a multiplicity of brush hairs, the second screen wall and the second brush element being movable relative to one another, and the brush hairs engaging at least partially into the screen wall openings in the case of a relative movement of the brush element with respect to the second screen wall. In accordance with this embodiment, a total of two screen devices are provided which are preferably structurally identical and mirror-symmetrical with respect to a plane which extends centrally between the two comminuting shafts in the throughflow direction and parallel to the comminuting shafts through the interior space. As an alternative, however, the second screen device can also be configured with a different geometry, a different arrangement or a different evacuating device than the first screen device. In the case of this embodiment with two screen devices, the first and second comminuting shaft are arranged between the two screen devices, with the result that the liquid which flows through the interior space can take a total of three general liquid flow paths through the interior space; one liquid path passes through the first screen device, one liquid path passes through the second screen device, and one liquid path passes through the region of the two comminuting shafts. The advantage of these two arrangements lies in the fact that a flow pattern which is homogeneous overall is achieved at the outlet and that, furthermore, solids coming from both sides can be conveyed through the first and second evacuating device in the direction of the comminuting shafts if the slots in the first and the second screen device are evacuated. For this purpose, it is advantageous, in particular, if the relative movement between the brush elements and the screen devices generates a flow movement of the fluid from the outside to the inside, that is to say directed onto the comminuting shafts, in order to convey solids to the comminuting shafts.

It is preferably provided here, furthermore, if the relative movement between the first screen wall and the first brush element and the relative movement between the second screen wall and the second brush element take place synchronously, preferably by means of a mechanical coupling to a common evacuating drive device. In accordance with this embodiment, the first evacuating drive device and the second evacuating drive device can be of integral configuration or can be coupled to one another and can be set jointly in rotation, in particular, which brings about a synchronous movement and a synchronous drive of the first and second evacuating drive device.

It is provided in accordance with a further preferred embodiment that the axial spacing between two axially adjacent first comminuting elements is at least as great as, at least twice as great as, at least five times as great as, or at least ten times as great as the ball passage of the openings in the screen walls. In accordance with this embodiment, the axial spacing between two axially adjacent first comminuting elements is at least twice as great as, in particular, at least five times as great as, preferably at least ten times as great as the ball passage of the openings. In accordance with this embodiment, the axial spacing between two adjacent comminuting elements in an axial direction is in a defined minimum size ratio to the ball passage of the openings in the first or the second screen wall. Here, a ball passage is to be understood to mean a measure which describes the diameter of a circular ball which just passes through the openings of the screen wall, that is to say the maximum diameter of a ball which can pass through an opening in the screen wall. The ratio which is defined in this way firstly ensures that solids above a defined size cannot pass through the interior space from the inlet opening to the outlet opening either through the screen wall or through the comminuting shafts. It is to be understood here that the spacing between two comminuting elements is understood to be the axial measure of the clearance in relation to the rotational axis of the comminuting shaft between the one comminuting element and the other comminuting element, that is to say, for example, in the case of disk-shaped comminuting elements with teeth on the circumference, the axial spacing between the end faces, pointing toward one another, of two axially adjacent disk-shaped cutting elements of a comminuting shaft. It is to be understood that, during operation, a cutting element of the second comminuting shaft engages into the intermediate space, which is configured in such a way and is formed by the axial spacing of two comminuting elements of the first comminuting shaft, and, as a result, constricts the passage cross section. This has the effect that only solids with very small dimensions can pass through in that region, in which the cutting elements of the first and second comminuting shaft mesh with one another. In contrast, in the regions which lie on the outside with respect thereto and in which the cutting elements do not mesh with one another, a greater cross section is provided for the passage of solids. The cutting elements can fundamentally carry out a movement which is directed counter to the flow direction of the solids in this outer region, that is to say in such a way, for example, that the first and second comminuting shaft carry out an opposed rotation which is directed in the flow direction of the liquid from the inlet opening to the outlet opening in the inner circumferential region, in which the cutting elements mesh with one another.

It is fundamentally to be understood here that the clearances between the cutting elements in the outer regions, in which the first and second cutting elements do not mesh with one another, can also be filled partially or completely by way of stationary elements which are fastened to the housing of the comminuting device, with which stationary elements the cutting elements then mesh correspondingly, in order to prevent the passage of solids above a defined size or overall in this outer region.

It is also preferred, furthermore, that the first and second comminuting shaft are driven in an opposed rotational direction, and that the first and second comminuting shaft axis preferably run parallel to one another and spaced apart from one another. In accordance with this embodiment, the two comminuting shafts extend parallel to one another, with the result that the rotational axes of the two comminuting shafts are at an identical spacing from one another overall. This construction can bring about, in particular, a satisfactory and homogeneous comminuting performance along the entire length of the comminuting shafts.

It is also preferred, furthermore, if the first screen wall has a curved screen wall surface which is preferably a cylindrical surface around the first screen drum axis. As a result of the configuration of the first screen wall with a curved screen wall surface, firstly sliding off of solids along the screen wall is promoted and, as a consequence, an accumulation of solids as would take place, for example, in the case of a planar screen wall surface is prevented. In particular, the curvature of the screen wall surface can be designed in such a way that the inlet opening of the screen wall pointing toward the inlet opening is curved convexly, with the result that an accumulation and collection of solids on the screen wall is avoided by the possibility of solids sliding off along the convexly curved surface. In particular, the configuration with a convex screen wall surface allows the relative movement to take place on a circular path and, as a consequence, for it to be possible for it to be configured as a rotational movement of the screen wall as a result of the cylindrical geometry of the screen wall.

BRIEF DESCRIPTION OF THE DRAWINGS

In the following text, one preferred embodiment of the invention will be explained on the basis of the appended figures. The following figures show the preferred embodiment of the comminuting device according to the invention in different views and perspectives. In the figures:

FIG. 3 shows a front view of a housing interior space of the comminuting device according to the invention according to FIG. 1 with a removed screen drum;

FIG. 3*a* shows a perspective view of the circled detail denoted by "A" from FIG. 3; and FIG. 3*b* shows a perspective view of the circled detail denoted by "B" from FIG. 3.

DETAILED DESCRIPTION OF THE EMBODIMENTS

Figure 1:
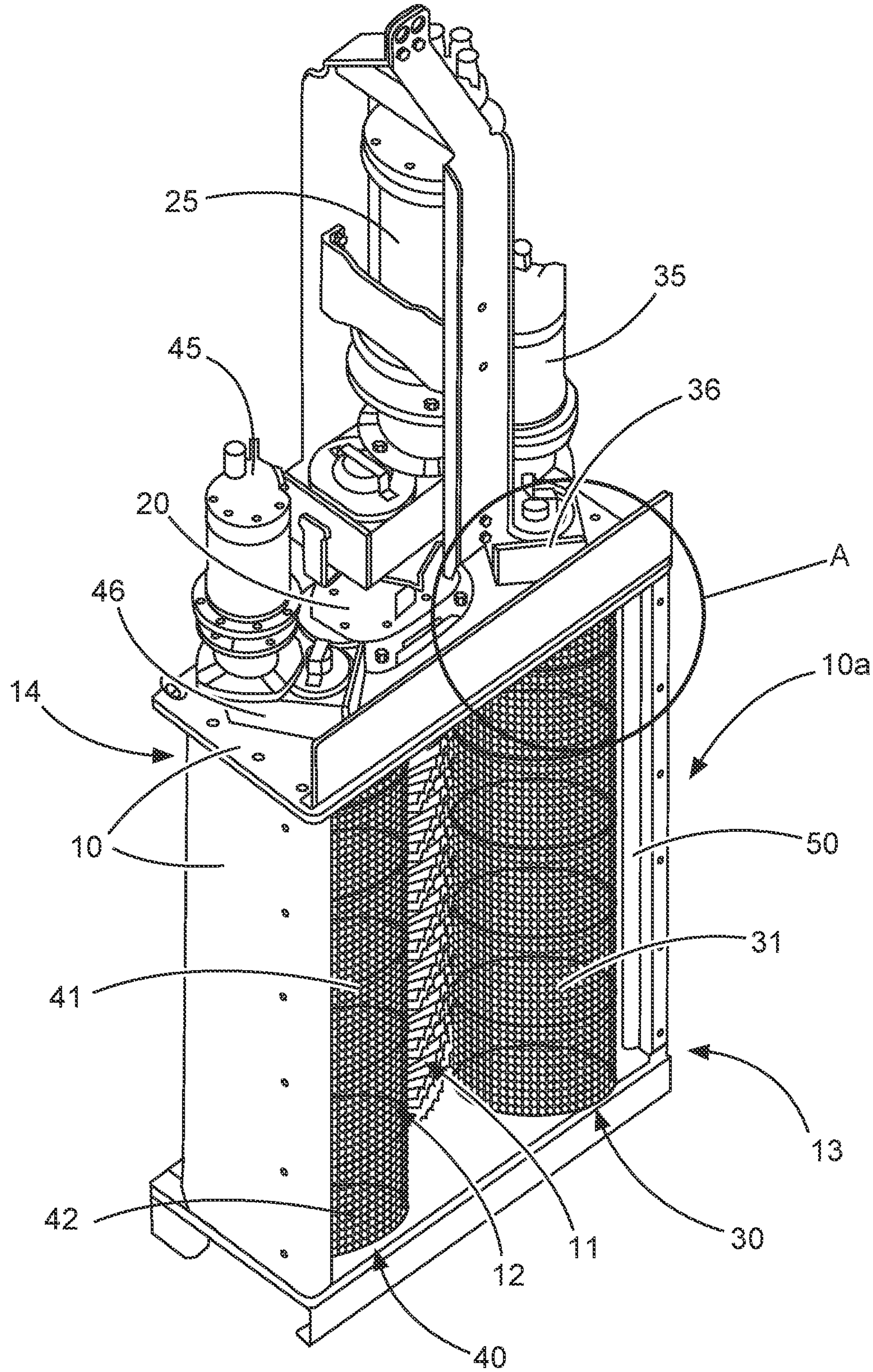
FIG. 1 shows a perspective view obliquely from the front and side of a comminuting device according to the invention.
Figure 2:
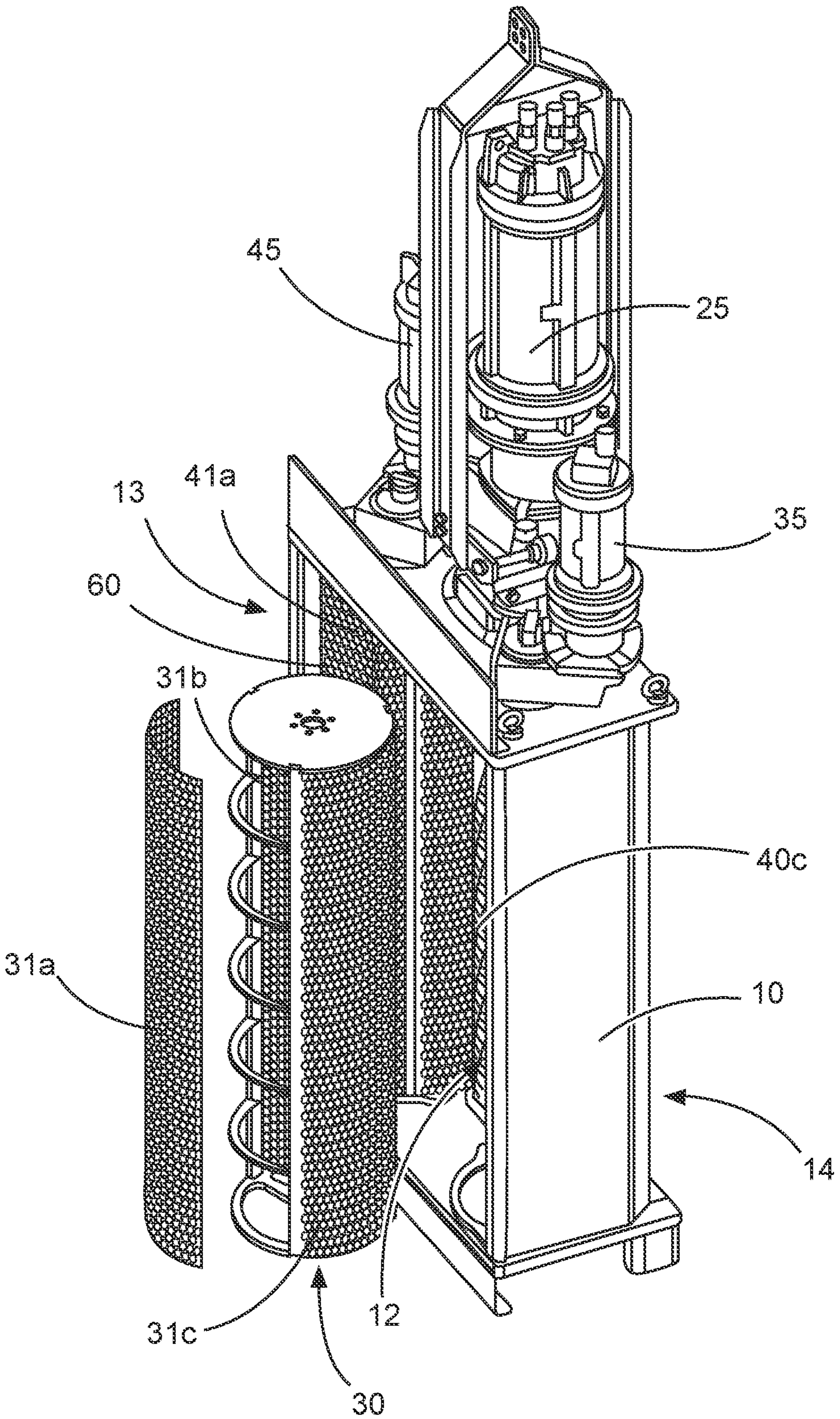
FIG. 2 shows a perspective side view of the comminuting device according to the invention according to FIG. 1 with a dismantled screen drum.

FIGS. 1, 2, and 3 show a housing 10 with a housing interior space 10 of a comminuting device according to the invention. The comminuting device has a first comminuting shaft 11 and a second comminuting shaft 12 (concealed in FIG. 1) mounted in the housing interior space 10*a* rotatably about a first and second comminuting shaft axis 100, 200, respectively, within the housing 10. The first comminuting shaft 11 and the second comminuting shaft 12 have a plurality of comminuting cutting elements which are configured on cutter disks 111, 112 and spaced apart axially along a first and a second comminuting shaft axis, respectively. Both the first comminuting shaft 11 and the second comminuting shaft 12 consist of a plurality of cutter disks 111, 112. The housing interior space 10 includes an inlet opening 13 and an outlet opening 14, through which solids or liquids which are loaded with solids can be fed to the housing interior space and can be discharged therefrom. The comminuting shafts 11, 12 extend in a vertical direction in the housing interior space in the installed position.

The two comminuting shafts 11, 12 rotate at a different rotational speed, with the result that, in the case of every revolution, different comminuting cutting elements of adjacent cutter disks 111, 112 of the two comminuting shafts 11, 12 come into engagement with one another, and a shearing action is achieved between the comminuting cutting elements.

A gear mechanism 20 is arranged in a gear mechanism space, which gear mechanism 20 consists of two gearwheels with a different number of teeth which are fastened directly on the comminuting shafts 11, 12 in a torque-transmitting manner and mesh with one another. As a result, an opposed rotational movement of the two comminuting shafts 11, 12 is produced, the two comminuting shafts 11, 12 running at a different rotational speed. One of the two comminuting shafts 11 or 12 is guided out of the housing interior space, and can be set in rotation by means of a drive motor 25. This rotation is transmitted by way of the gear mechanism 20 to the other comminuting shaft 11, 12. As a result, the first comminuting shaft 11 rotates about a first comminuting shaft axis, and the second comminuting shaft 12 rotates about a second comminuting shaft axis in an opposite rotational direction. The first comminuting shaft axis and the second comminuting shaft axis run parallel to and spaced apart from one another.

In each case, eight comminuting cutting elements which are distributed homogeneously in the circumferential direction are configured on the circumference of each cutter disk 111, 112. The comminuting cutting elements form helical curves of a thread with a steep lead along the circumference of each comminuting shaft 11, 12. The comminuting cutting elements of one comminuting shaft form a left-handed thread, and the comminuting cutting elements of the other comminuting shaft form a right-handed thread.

A first screen drum 30 is arranged adjacently with respect to the first comminuting shaft 11, which first screen drum 30 is mounted in the housing such that it can be rotated about a first screen drum axis 300. The first screen drum 30 comprises a first screen wall 31 which has a cylindrical surface and is formed by way of a total of three screen wall segments 31*a-c*. Each screen wall segment has a multiplicity of openings 32.

The screen drum 30 is set in rotation about the screen drum axis 300 by means of a drive motor 35 via a gear mechanism 36.

Figure 1C:
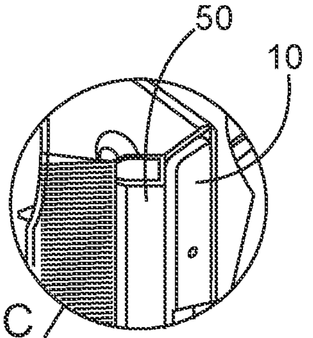
FIG. 1*c* shows a perspective view of the circled detail denoted by "C" from FIG. 1*a;*
Figure 1A:
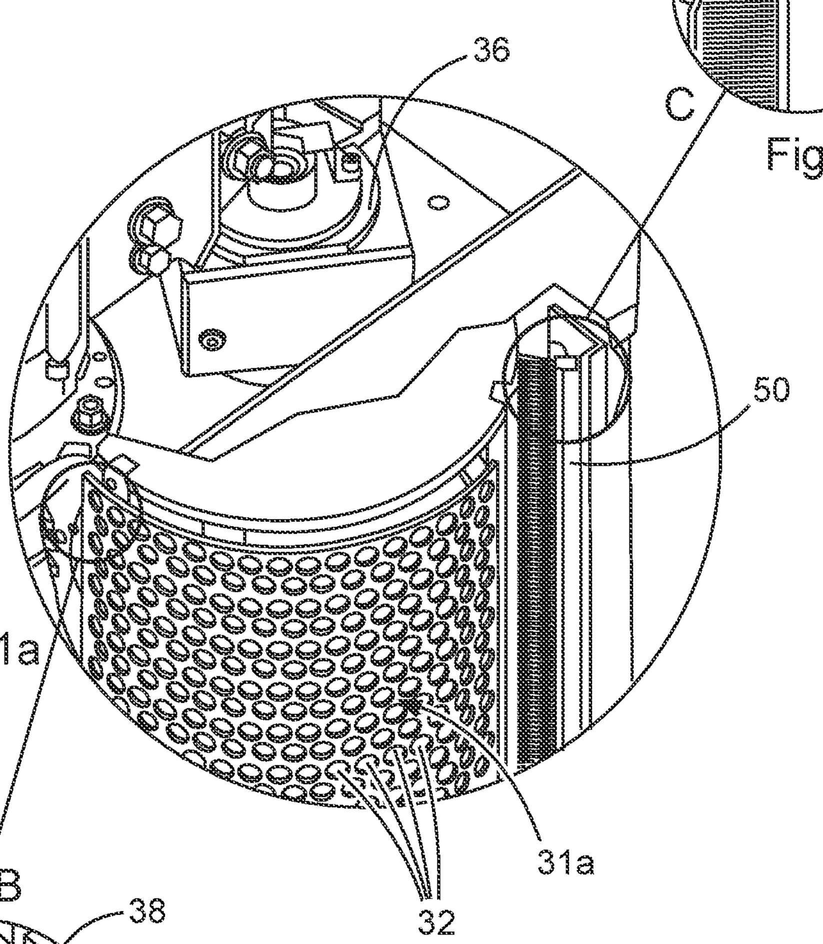
FIG. 1*a* shows a perspective view of the circled detail denoted by "A" from FIG. 1.

A brush element 50 (shown in greater detail in FIGS. 1*a* and 1*c*) lies adjacently with respect to the first screen drum 30 and extends parallel to the first screen drum axis 300. The brush element 50 is arranged on and fastened to the outer edge of the housing. It comprises a multiplicity of brush hairs, and is arranged at a spacing from the first screen drum axis 300 such that the brush hairs sweep over the outer surface of the screen wall 31 and protrude to a small extent into the openings 32. If the screen drum is rotated about the screen drum axis, the brush hairs therefore free the openings of solids situated therein, and keep the openings free as a result.

In an analogous manner with respect thereto, a second screen drum 40 is mounted adjacently with respect to the second comminuting shaft 12 and such that it can be rotated about a second screen drum axis 400, and a second brush element is arranged adjacently with respect thereto. In FIG. 2, the mounting position of said second brush element is denoted by way of the designation 60. The second screen drum 40 and the second brush element at the mounting position 60 are of mirror-symmetrical configuration about a mirror plane, lying between the two comminuting shafts, with respect to the first screen drum 30 and the first brush element 50, and comprise a second cylindrical screen wall 41 which is likewise formed from three screen wall segments 41*a-c* which in each case have a multiplicity of openings 42.

The comminuting shaft axes 100, 200 and the screen drum axes 300, 400 are arranged parallel to one another and extend transversely with respect to the throughflow direction of the housing from the inlet opening to the outlet opening.

The cylinder surfaces of the first and the second screen wall 31, 41 in each case form a convex outer surface. An angular region of approximately 120° of the cylinder surface of the first screen drum 30 about the drum longitudinal axis 300 points toward the inlet opening, and is delimited by way of the first brush element 50 and the first comminuting shaft 11 which lies adjacently with respect to the first screen drum 30. In the same way, an angular region of approximately 120° of the cylinder surface of the second screen drum 40 about the screen drum axis 400 points toward the inlet opening, and is delimited by way of the second brush element at the mounting position 60 and the second comminuting shaft 12 which lies adjacently with respect to the second screen drum 40.

Figure 1B:
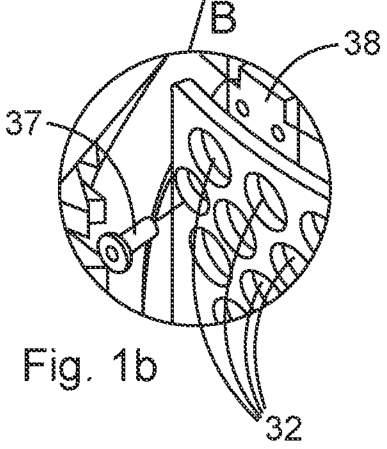
FIG. 1*b* shows a perspective view of the circled detail denoted by "B" from FIG. 1*a;*

As shown in detail in FIG. 1B, the screen wall segments 31*a-c* and 41*a-c* are fastened releasably to a first and second screen drum frame 38, respectively, in each case by means of a plurality of screws 37. The screen drum frame 38 is formed by way of end-side round end plates and by way of three longitudinal struts which extend axially in the region of the outer circumference. Each screen wall segment 31*a-c*, 41*a-c* extends over a circumferential angle of 120° around the drum longitudinal axis 300 and 400, respectively. After the screw fastening is released, a screen wall segment can therefore be taken off from the screen drum which is mounted in the housing from the screen drum frame toward the inlet opening, and can be removed through the inlet opening, as shown in FIG. 2.

As a result of the removal of a single screen wall segment 31*a-c* or 41*a-c*, the interior space of the screen wall drum 30, 40 becomes accessible. As shown in detail in FIGS. 3*a* and 3*b*, the screen wall drum 30 is mounted in an upper anti-friction bearing 18 and a lower plain bearing 19 in the housing by way of an upper axle stub 38 and a lower axle stub 39, such that it can be rotated about the screen drum axis 300. The axle stubs 38, 39 are fastened releasably to the respective upper and lower end plates of the screen drum frame by means of screws 38*a*, 39*a*. After this screw connection is released, the axle stubs 38, 39 can be pulled axially out of the bearings 18, 19 into the interior space of the screen drum, as a result of which the rotary guidance and securing of the screen drum in the housing is canceled. As a result, the first screen drum 30 can be removed in the radial direction from the housing through the inlet opening, as shown in FIG. 2.

This dismantling possibility is realized accordingly in the same way for the second screen drum 40.

The invention claimed is:

1. A comminuting device for solids-conducting liquids comprising:

a housing with an inlet opening, an outlet opening and a housing interior space which extends from the inlet opening to the outlet opening;

a first comminuting shaft extending through the housing interior space and arranged for rotation about a first comminuting shaft axis, to which a multiplicity of first comminuting cutting elements which are spaced apart axially along the first comminuting shaft axis are fastened;

a drive device for driving the first comminuting shaft in a rotational movement;

a comminuting flow path extending through the interior space from the inlet opening around the comminuting shaft to the outlet opening;

a first screen device arranged in the housing interior space adjacently with respect to the first comminuting shaft with a first screen wall having a multiplicity of screen wall openings and a first evacuating device for removing blockages from the screen wall openings, the first screen device and the first evacuating device being movable relative to one another; and a bypass flow path running in parallel to the comminuting flow path and extending through the screen wall openings from the inlet opening to the outlet opening;

wherein the first evacuating device is formed by at least one first brush element with a multiplicity of brush hairs, the first screen wall and the first brush element being movable relative to one another, and the brush hairs engaging at least partially into the screen wall openings during relative movement of the first brush element with respect to the first screen wall;

wherein the first screen device is configured as a screen drum about a screen drum axis, the screen drum having a circumference on which the first screen wall is arranged;

wherein the screen drum is arranged adjacently with respect to the first comminuting shaft, and the first screen wall extends, starting from the region which adjoins the first comminuting shaft, over an inlet circumferential angle which defines the circumferential portion of the screen drum, via which fluid which flows in through the inlet opening can flow through the first screen wall into the screen drum, and the first screen wall is divided into a plurality of screen wall segments, of which at least one screen wall segment extends over a segment circumferential angle about the screen drum axis which is less than or equal to the inlet circumferential angle, or over an outlet circumferential angle which defines the circumferential portion of the screen drum, via which fluid which flows to the outlet opening can flow out of the screen drum through the first screen wall, and the first screen wall is divided into a plurality of screen wall segments, of which at least one screen wall segment extends over a segment circumferential angle about the screen drum axis which is less than or equal to the outlet circumferential angle; and wherein the screen drum has a screen drum frame to which the screen wall segments are fastened, and in that the at least one screen wall segment is fastened releasably to the screen drum frame and can be unfastened radially to the outside in relation to the screen drum axis.

2. The comminuting device as claimed in claim 1, wherein a second comminuting shaft extends through the housing interior space, is arranged for rotation about a second comminuting shaft axis, and to which a multiplicity of second comminuting cutting elements which are spaced apart axially along the second comminuting shaft axis are fastened, the drive device being configured to drive the second comminuting shaft in a rotational movement.

3. The comminuting device as claimed in claim 1, wherein an evacuating drive device is coupled to the first screen device or the first evacuating device for the generation of a relative movement between the first screen device and the first evacuating device.

4. The comminuting device as claimed in claim 1, wherein the screen drum is mounted rotatably about the screen drum axis, and an evacuating drive device is coupled to the screen drum in order to drive the screen drum in a rotational movement about the screen drum axis.

5. The comminuting device as claimed in claim 1, wherein the screen wall segments are fastened in an outer circumferentially flush manner to the screen drum frame, such that the outer surface of the screen wall segments is arranged about the screen drum axis at a radius which is greater than or equal to the radius of a proportion of the screen drum frame which projects to the outside; or the screen wall segments are fastened in an outer circumferentially flush manner with respect to one another to the screen drum frame, such that the outer surface of the screen wall segments covers the screen drum frame completely.

6. The comminuting device as claimed in claim 1, wherein:

the screen drum is mounted in the housing by means of two opposed axle stubs such that the screen drum can be rotated about the screen drum axis; and the axle stubs can be dismantled from the interior space of the screen drum or from outside the housing.

7. The comminuting device as claimed in claim 1, wherein after dismantling of a drum axis mount, the screen drum can be removed from the housing through the inlet opening or outlet opening in a radial direction in relation to the screen drum axis.

8. The comminuting device as claimed in claim 1, wherein:

the screen drum is mounted in the housing rotatably about the screen drum axis at a first end by way of a first rotary bearing and at a second end by way of a second rotary bearing; and the first or the second rotary bearing is a plain bearing.

9. The comminuting device as claimed in claim 3, wherein the evacuating drive device comprises:

hydrodynamically acting fluid guiding elements which are arranged in the interior space and are flowed onto by a liquid flow flowing through the interior space; or an electrically, pneumatically or hydraulically driven motor.

10. The comminuting device as claimed in claim 1, further comprising a second comminuting shaft between the first screen device and a second screen device, the second screen device comprising a second screen wall having a plurality of openings, and a second evacuating device with at least one second brush element with a multiplicity of brush hairs, the second screen wall and the second brush element being movable relative to one another, and the brush hairs engaging at least partially into the screen wall openings of the second screen wall in the case of a relative movement of the second brush element with respect to the second screen wall.

11. The comminuting device as claimed in claim 10, wherein the relative movement between the first screen wall and the first brush element and the relative movement between the second screen wall and the second brush element take place synchronously by means of a mechanical coupling to a common evacuating drive device.

12. The comminuting device as claimed in claim 1, further comprising a second comminuting shaft extending through the housing interior space and arranged for rotation about a second comminuting shaft axis, to which a multiplicity of second comminuting cutting elements which are spaced apart axially along the second comminuting shaft axis are fastened, wherein an axial spacing between the first and second axially adjacent comminuting cutting elements is at least as great as twice as great as the ball passage of the openings in the screen walls.

13. The comminuting device as claimed in claim 1, wherein each of the openings or at least the plurality of the openings in the first screen wall extend in the circumferential direction over a length which is different by not more than 50% from an extent of the opening in the axial direction in relation to the screen drum axis.

14. The comminuting device as claimed in claim 1, further comprising a second comminuting shaft extending through the housing interior space and arranged for rotation about a second comminuting shaft axis, to which a multiplicity of second comminuting cutting elements which are spaced apart axially along the second comminuting shaft axis are fastened, and wherein the first and second comminuting shafts are driven in an opposed rotational direction, and the first and second comminuting shaft axis run parallel to one another and spaced apart from one another.

15. The comminuting device as claimed in claim 1, wherein the first screen wall has a curved screen wall surface which defines a cylindrical surface around the first screen drum axis.

16. A comminuting device for solids-conducting liquids comprising:

a housing with an inlet opening, an outlet opening and a housing interior space which extends from the inlet opening to the outlet opening;

a first comminuting shaft extending through the housing interior space and arranged for rotation about a first comminuting shaft axis, to which a multiplicity of first comminuting cutting elements which are spaced apart axially along the first comminuting shaft axis are fastened;

a second comminuting shaft extending through the housing interior space and arranged for rotation about a second comminuting shaft axis, to which a multiplicity of second comminuting cutting elements which are spaced apart axially along the second comminuting shaft axis are fastened, wherein the first and second comminuting shaft axis run parallel to one another and are spaced apart from one another;

a drive device for driving the first and second comminuting shafts in a rotational movement;

a comminuting flow path extending through the interior space from the inlet opening around the comminuting shaft to the outlet opening;

a first screen device arranged in the housing interior space adjacently with respect to the first comminuting shaft with a first screen wall having a multiplicity of screen wall openings and a first evacuating device for removing blockages from the screen wall openings, the first screen device and the first evacuating device being movable relative to one another; and a second screen device arranged in the housing interior space adjacently with respect to the second comminuting shaft with a second screen wall having a multiplicity of screen wall openings and a second evacuating device for removing blockages from the screen wall openings, the second screen device and the second evacuating device being movable relative to one another; and a bypass flow path running in parallel to the comminuting flow path and extending through the screen wall openings from the inlet opening to the outlet opening;

wherein the first and second evacuating devices are formed by at least one brush element with a multiplicity of brush hairs, the screen wall openings of each of the first screen wall or second screen wall and the first brush element being movable relative to one another, respectively, and the brush hairs engaging at least partially into the screen wall openings during relative movement of the first brush element with respect to the first screen wall or the second screen wall;

wherein the first screen device is configured as a screen drum about a screen drum axis, the screen drum having a circumference on which the first screen wall is arranged;

wherein the first screen wall extends, starting from the region which adjoins the first comminuting shaft, over an inlet circumferential angle which defines the circumferential portion of the screen drum, via which fluid which flows in through the inlet opening can flow through the first screen wall into the screen drum, and the first screen wall is divided into a plurality of screen wall segments, of which at least one screen wall segment extends over a segment circumferential angle about the screen drum axis which is less than or equal to the inlet circumferential angle, or over an outlet circumferential angle which defines the circumferential portion of the screen drum, via which fluid which flows to the outlet opening can flow out of the screen drum through the first screen wall, and the first screen wall is divided into a plurality of screen wall segments, of which at least one screen wall segment extends over a segment circumferential angle about the screen drum axis which is less than or equal to the outlet circumferential angle; and wherein the screen drum has a screen drum frame to which the screen wall segments are fastened, and in that the at least one screen wall segment is fastened releasably to the screen drum frame and can be unfastened radially to the outside in relation to the screen drum axis.

17. A comminuting device for solids-conducting liquids comprising:

a housing with an inlet opening, an outlet opening and a housing interior space which extends from the inlet opening to the outlet opening;

a first comminuting shaft extending through the housing interior space and arranged for rotation about a first comminuting shaft axis, to which a multiplicity of first comminuting cutting elements which are spaced apart axially along the first comminuting shaft axis are fastened;

a drive device for driving the first comminuting shaft in a rotational movement;

a comminuting flow path extending through the interior space from the inlet opening around the comminuting shaft to the outlet opening;

a first screen device arranged in the housing interior space adjacently with respect to the first comminuting shaft with a first screen wall having a multiplicity of screen wall openings and a first evacuating device for removing blockages from the screen wall openings, the first screen device and the first evacuating device being movable relative to one another; and a bypass flow path running in parallel to the comminuting flow path and extending through the screen wall openings from the inlet opening to the outlet opening;

wherein the first evacuating device is formed by at least one first brush element with a multiplicity of brush hairs, the first screen wall and the first brush element being movable relative to one another, and the brush hairs engaging at least partially into the screen wall openings during relative movement of the first brush element with respect to the first screen wall;

wherein the first screen device is configured as a screen drum about a screen drum axis, the screen drum having a circumference on which the first screen wall is arranged and the screen drum comprising a plurality of screen wall segments;

wherein the screen drum is mounted in the housing by means of two opposed axle stubs such that the screen drum can be rotated about the screen drum axis, the axle stubs are accessed by removal of one of the plurality of screen wall segments, and the axle stubs may be dismantled from the interior space of the screen drum;

wherein the first screen wall extends, starting from the region which adjoins the first comminuting shaft, over an inlet circumferential angle which defines the circumferential portion of the screen drum, via which fluid which flows in through the inlet opening can flow through the first screen wall into the screen drum, and the first screen wall is divided into a plurality of screen wall segments, of which at least one screen wall segment extends over a segment circumferential angle about the screen drum axis which is less than or equal to the inlet circumferential angle, or over an outlet circumferential angle which defines the circumferential portion of the screen drum, via which fluid which flows to the outlet opening can flow out of the screen drum through the first screen wall, and the first screen wall is divided into a plurality of screen wall segments, of which at least one screen wall segment extends over a segment circumferential angle about the screen drum axis which is less than or equal to the outlet circumferential angle; and wherein the screen drum has a screen drum frame to which the screen wall segments are fastened, and in that the at least one screen wall segment is fastened releasably to the screen drum frame and can be unfastened radially to the outside in relation to the screen drum axis.

* * * * *